United States Patent
Kuroda et al.

(10) Patent No.: US 10,501,210 B2
(45) Date of Patent: Dec. 10, 2019

(54) AEROSPACE VEHICLE SYSTEM

(75) Inventors: Yoshikatsu Kuroda, Komaki (JP); Masahiro Atsumi, Komaki (JP); Naohiko Abe, Komaki (JP); Masahiro Kato, Komaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 407 days.

(21) Appl. No.: 12/254,456

(22) Filed: Oct. 20, 2008

(65) Prior Publication Data

US 2009/0206205 A1 Aug. 20, 2009

(30) Foreign Application Priority Data

Feb. 15, 2008 (JP) .................................. 2008-034025

(51) Int. Cl.
*B64G 1/24* (2006.01)
*B64G 1/00* (2006.01)

(52) U.S. Cl.
CPC .................................. *B64G 1/002* (2013.01)

(58) Field of Classification Search
CPC .................................. B64G 1/00; B64G 1/14
USPC ............ 244/171.1, 172, 158.1, 171.2, 171.3, 244/173.3, 3.14, 3.15, 3.19
See application file for complete search history.

(56) References Cited

U.S. PATENT DOCUMENTS

| | | | | |
|---|---|---|---|---|
| 3,116,035 A | * | 12/1963 | Cutler | ...................... B64G 1/24 244/165 |
| 3,768,254 A | * | 10/1973 | Stuart | ....................... F02K 7/08 60/204 |
| 4,451,017 A | | 5/1984 | Marshall | |
| 4,471,926 A | | 9/1984 | Steel, III | |

(Continued)

FOREIGN PATENT DOCUMENTS

| | | |
|---|---|---|
| JP | 2002-310004 A | 10/2002 |
| JP | 2003-20000 A | 1/2003 |

(Continued)

OTHER PUBLICATIONS

European Search Report dated Jun. 29, 2009, issued in corresponding European Patent Application No. 08164455.1.

(Continued)

*Primary Examiner* — Tien Q Dinh
*Assistant Examiner* — Michael A. Fabula
(74) *Attorney, Agent, or Firm* — Westerman, Hattori, Daniels & Adrian, LLP

(57) ABSTRACT

In an aerospace vehicle in which a satellite is detachably adapted to the first stage rocket and the second stage rocket, an electronic device 65 is installed in the satellite 60, wherein the electronic device 65 controls the first stage rocket 10 and the second stage rocket 20 before the satellite is detached from the first stage rocket 10 and the second stage rocket 20. Thereby, it is unnecessary to provide sensors, radio devices and electronic devices for exclusive use with respect to the first stage rocket 10 and the second (Continued)

stage rocket 20 so that a manufacturing cost of the rockets 10 and 20 can be reduced and a total weight of the rockets 10 and 20 can become lighter by omitting these equipments. Thus, an aerospace vehicle system within the rockets 10 and 20 can be simplified and a launch of the aerospace vehicle can be prepared within a short period.

5 Claims, 2 Drawing Sheets

(56) References Cited

U.S. PATENT DOCUMENTS

| | | | | |
|---|---|---|---|---|
| 5,152,482 | A * | 10/1992 | Perkins | B64G 1/22 |
| | | | | 244/159.4 |
| 5,186,419 | A | 2/1993 | Scott | |
| 5,271,582 | A * | 12/1993 | Perkins | B64G 1/22 |
| | | | | 244/159.4 |
| 5,758,846 | A | 6/1998 | Fowell | |
| 6,921,051 | B2 * | 7/2005 | Lopata et al. | 244/158.9 |
| 6,968,673 | B1 * | 11/2005 | Knight | F02K 9/42 |
| | | | | 60/200.1 |
| 7,137,588 | B2 | 11/2006 | Humphrey | |
| 8,104,719 | B2 * | 1/2012 | Shiau et al. | 244/171.3 |
| 2002/0171011 | A1 * | 11/2002 | Lopata | B64G 1/002 |
| | | | | 244/158.5 |
| 2005/0150998 | A1 | 7/2005 | Devries et al. | |

FOREIGN PATENT DOCUMENTS

| | | |
|---|---|---|
| JP | 2005-178771 A | 7/2005 |
| WO | WO-2008088330 A2 * | 7/2008 |

OTHER PUBLICATIONS

Japanese Office Action dated Sep. 20, 2011, issued in corresponding Japanese Patent Application No. 2008-034025.
Japanese Office Action dated Jun. 5, 2012, issued in corresponding Japanese Patent Application No. 2008-034025, with English translation (5 pages).

* cited by examiner

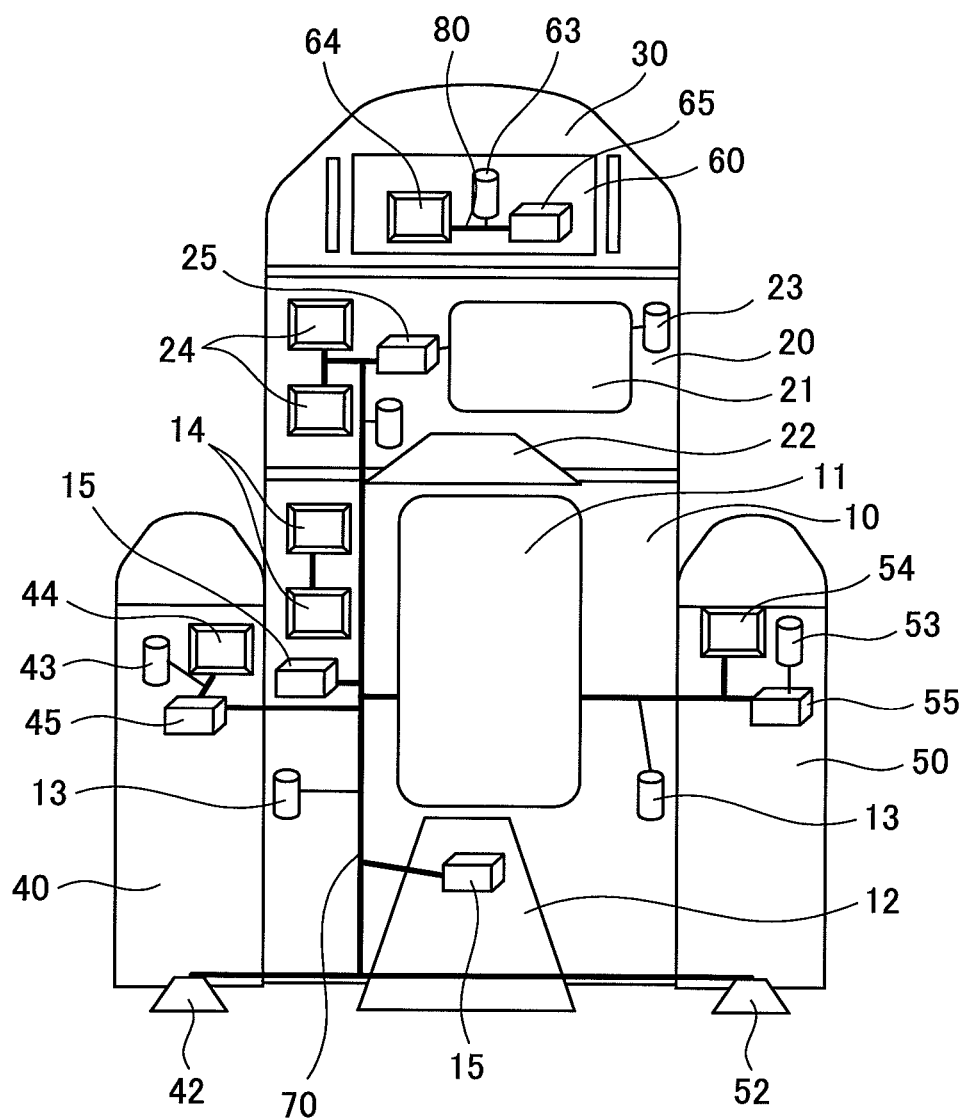

AEROSPACE VEHICLE SYSTEM

BACKGROUND OF THE INVENTION

Field of the Invention

The present invention relates to an aerospace vehicle system, particularly to an aerospace vehicle system with a relatively low manufacture cost and a relatively light body weight.

Prior Art

FIG. 2 attached to the present application shows an outline of such a conventional aerospace vehicle system. FIG. 2 shows a two-stage rocket (multi-stage rocket) having a first stage rocket 10 and a second stage rocket 20.

The second stage rocket 20 is set on the first stage rocket 10. A fairing 30 is set on the second stage rocket 20 as a front end portion.

In the first stage rocket 10, a fuel tank 11 and a rocket engine 12 are provided. Further, a plurality of boosters 40 and 50 are included, wherein each booster has a rocket engine 42 (52).

In the second stage rocket 20, a fuel tank 21 and a rocket engine 22 are provided. In the fairing 30 set on the second stage rocket 20, a satellite 60 is detachably installed.

Accordingly, after igniting the first stage rocket 10 and the boosters 40, 50, the second rocket 20 is separated from the first stage rocket 10 and then the separated second stage rocket 20 is ignited. After the aerospace vehicle approaching into outer space, the satellite 60 is separated from the second stage rocket 20 and the satellite 60 can be put on orbit.

In the above described conventional aerospace vehicle system, the first stage rocket 10 and the second stage rocket 20 has various kinds of sensors, radio devices and electronic devices (such as computers) are provided with respect to each rockets 10 and 20, respectively. By utilizing the various kinds of the sensors, the radio devices and the electronic devices, the aerospace vehicle and the rockets are controlled.

That is, the first stage rocket 10 and the second stage rocket 20, each rockets 10 (20) has various kinds of sensors 13 (23) such as an acceleration sensor and angular acceleration (gyro meter), respectively. Further, the each rocket 10 (20) has a radio device 14 (24) for communication with a radio base on the earth and an electronic device (such as computer) 15 (25) are included. The electronic device 15 (25) is electrically connected to the sensor 13 (23), the radio device 14 (24) and the rocket engine 12 (22) through a rocket exclusive use bus (signal lines) 70.

In addition, various kinds of sensors 43 (53), a radio device 44 (54) and an electronic device 45 (54) are provided to the respective booster 40 (50). The electronic device 45 (55) is electrically connected to the various kinds of sensors 43 (53), the radio device 44 (54) and a rocket engine 42 (52) through a rocket exclusive use bus (signal lines).

Accordingly, in accordance with signals obtained from the respective sensors 13, 23, 43 and 53 and commands received from the radio devices 14, 24, 44 and 54, the electronic devices 15, 25, 45 and 55 can control the rocket engines 12, 22, 42 and 53, respectively.

On the other hand, the satellite 60 is put on outer space by the two staged rocket (multi-staged rocket), the satellite 60 is controlled by itself by utilizing various kinds of sensors, a radio device and an electronic device (such as a computer), and those are equipped in the satellite for an exclusive use.

That is, in the satellite 60, various kinds of exclusive use satellite sensors 63, an exclusive use radio device 64 for communicating with a radio base on the earth and an exclusive use electronic device (such as computer) 65 are installed. The electronic device 65 is electrically connected to the various kinds of sensors 63 and the radio device 64 through an exclusive use satellite bus (signal lines) 80.

Accordingly, in the satellite 60 separated from the two staged rocket, in accordance with signals obtained by the various kinds of sensors 63 and commands received from the radio device 64, the satellite can be controlled by itself.

In the above described conventional aerospace vehicle system, after the two rocket carried the satellite 60 to outer space, a lot of various kinds of expensive sensors 13, 23, 43 and 53, expensive radio devices 14, 24, 44 and 45 and expensive electronic devices 15, 25, 45 and 55 are wasted at all. By including these equipments, its manufacturing cost and its total body weight of the first rocket and the second stage rocket 20 are increased. Further, aerospace vehicle systems in the first stage rocket 10 and the second stage rocket 20 become very complicated and a time period for preparing a launch of an aerospace vehicle becomes longer.

U.S. Patent Publication No.2005/0150998 discloses a communication structure for an aerospace vehicle in which a satellite is not shipped.

Devries describes, "Sensors are accessible and coupled to ordnance controller 14 via addressable bus 22", at a paragraph of [0020] in U.S. Patent Publication No. 2005/0150998. By utilizing the addressable bus 22, the initiator and the sensors can be controlled by the single ordnance controller 14.

SUMMARY OF THE INVENTION

To resolve the above subject, in an aerospace vehicle according to the present invention in which a space tool such as an artificial satellite (herein after, it is referred as "satellite") detachably attached to an aerospace vehicle of which a rocket is one, two or more than rocket, the aerospace vehicle system is characterized in that the satellite comprises an electronic device for controlling the satellite after the satellite detached from the rocket and controlling the rocket before the satellite detached from the rocket.

To resolve the above subject, an aerospace vehicle system according to the present invention comprises a satellite including a radio device and various kinds of sensors and the aerospace vehicle system is characterized in that the electronic device is connected to the radio device and the various kinds of sensors through signal lines in the aerospace vehicle system according to the present invention.

To resolve the above subject, an aerospace vehicle system according to the present invention comprises a rocket having a rocket engine with respective to each rocket and the aerospace vehicle system is characterized in that the electronic device is connected to the rocket engine in the each rocket through signal lines in the aerospace vehicle system according to the present invention.

To resolve the above subject, an aerospace vehicle system according to the present invention comprises at least one booster attached to a rocket and the aerospace vehicle system is characterized in that the electronic device is connected to the booster of the rocket engine through signal lines in the aerospace vehicle system according to the present invention.

In the aerospace vehicle system according to the present invention, an aerospace vehicle comprises a satellite detachably attached from the first stage rocket the second stage rocket and more stage rocket wherein an electronic device installed at the satellite controls not only the satellite but also the each stage rocket. Therefore, it is unnecessary for each rocket to provide exclusive use sensors, an exclusive use radio device and an exclusive use electronic device. As the result, a manufacturing cost and a total body weight of the rocket can be decreased and a communication/control system in each rocket can be simplified and a time period for launching the aerospace vehicle can be shortened.

In the aerospace vehicle system according to the present invention, after the satellite is detached from the rocket, an electronic device installed in the satellite controls the satellite through signal lines in accordance with signals obtained from various kinds of sensors and commands received from the radio device In the aerospace vehicle system according to the present invention, before the satellite is detached from the rocket, an electronic device installed in the satellite controls a rocket engine of each rocket.

In the aerospace vehicle system according to the present invention, before the satellite is detached from the rocket, an electronic device installed in the satellite controls a rocket engine of each booster attached to a respective stage rocket through signal lines.

BRIEF DESCRIPTION OF THE DRAWINGS

FIG. 2 shows an outline of a conventional aerospace vehicle system.

DETAILED DESCRIPTION OF THE PREFERRED EMBODIMENT

Figure 1:
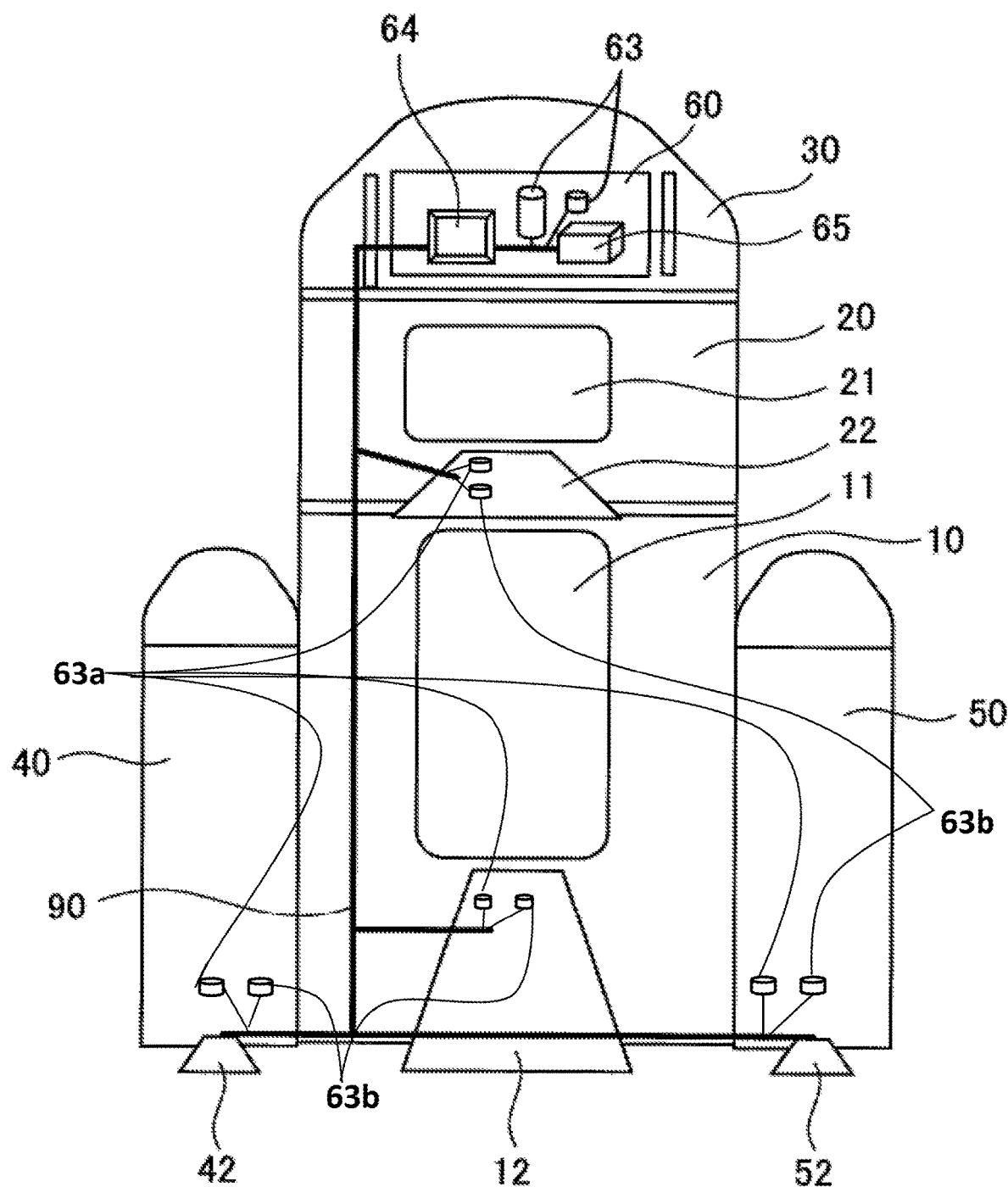
FIG. 1 shows an outline of an aerospace vehicle of the first embodiment according to the present invention.

The present invention relates to an aerospace vehicle in which a satellite is installed, wherein the aerospace vehicle has two rocket or more than two staged rocket (multi-staged rocket) and an installed satellite is capable of separating from the rocket. Rocket exclusive use sensors, rocket exclusive use radio devices and rocket exclusive use electronic devices (such as computers) are not installed in the rocket. Before the satellite is separated from the rocket, the rocket is controlled by an electronic device installed in the satellite. An embodiment as described below is the best mode of the embodiment of the present invention.

[Embodiment 1]

FIG. 1 shows an aerospace vehicle system of the first embodiment according to the present invention. The embodiment employs a two staged rocket (multi-staged rocket) consisted of the first stage rocket 10 and the second stage rocket 20.

That is, the second rocket 20 is provided on the first rocket 10 and a fairing 30 is set on the second stage rocket 20 as a front end portion.

The first stage rocket 10 comprises a fuel tank 11 and a rocket engine 12. Further, a plurality of boosters 40 and 50 having rocket engines 42 and 52 are attached.

The second stage rocket 20 comprises a fuel tank 21 and a rocket engine 22. In the fairing 30 on the second stage rocket 20, a satellite 60 is detachably installed.

Although the embodiment shows two staged rocket as an aerospace vehicle system, the aerospace vehicle system according to the present invention may employ a first staged rocket and exclude the boosters 40 and 50.

The first stage rocket 10 and the second stage rocket 20 need not to comprise various kinds of sensors such as an acceleration sensor, an angular acceleration sensor (gyro meter), a radio device for communicating with a radio base on the earth and an electronic device (such as computer), respectively.

The various kinds of sensors, the radio device and the electronic device (such as computer) are not installed in the boosters 40 and 50.

On the other hand, various kinds of sensor such as an acceleration sensor 63, a radio device for communicating with a radio base on the earth and an electronic device (such as computer) 65 are only installed in the satellite 60 in the fairing. The satellite 60 can be detached from the fairing on the second stage rocket 20.

The electronic device 65 is electrically connected to the various kinds of sensors 63 and the radio device 64 through a rocket-satellite common bus (signal line) 90. Further, the rocket engine 12 of the first stage rocket 10 and the rocket engine 22 of the second stage rocket 20 and jet engines 42 and 52 of the boosters 40 and 50 are electrically connected within the aerospace vehicle system. As the rocket-satellite common use bus 90, a bus disclosed in the patent document 1 is applicable.

Accordingly, before the satellite 60 is separated from the second stage rocket, the electronic device 65 can control the all rocket engines 12, 22, 42 and 52 in accordance with signals obtained form various kinds of sensors 63 and commands received from the radio device 64. After the satellite 60 is separated from the second rocket, the satellite is controlled by itself in accordance with signals from various kinds of sensors 63 and commands received from the radio device 64.

A pressure sensor and a thermo sensor (not illustrated in the drawings) are adapted to the rocket engines 12, 22, 42 and 52. These sensors and the electronic device 65 are electrically connected through the rocket-satellite common use bus 90.

When the satellite 60 is separated from the two staged rocket, the rocket-satellite common use bus 90 is divided into a satellite portion and a rocket portion.

As described above, in the embodiment, rocket exclusive-use sensors, an exclusive use radio device and an exclusive use electromagnetic device (computer) are not installed in the first stage rocket 10 and the second stage rocket 20, respectively. Before the satellite 60 is separated from the first stage rocket 10 and the second stage rocket 20, the electronic device 65 installed in the satellite 60 controls the first stage rocket 10 and the second stage rocket 20. As the result, the manufacturing cost and the total weight of the first stage rocket 10 and the second stage rocket can be reduced by omitting these equipments. In addition, it is obtained an effect that an aerospace vehicle system arranged within the first stage rocket 10 and the second stage rocket 20 can be simplified and a time period for preparing a launch of an aerospace vehicle can be shortened.

On the other words, in the conventional aerospace vehicle system, expensive electronic devices, sensors and radio devices are wasted together with a launched rocket after the satellite is separated from the rocket. Therefore, an aerospace vehicle is required high manufacturing cost, heavy total weight, complicated systems and a long launch time period. On the contrary, the present invention provides the minimum system with the minimum number of electronic devices, sensors and radio devices so that an aerospace vehicle can be manufactured with remarkably low manufacturing cost and a lighter total weight. A launch of the aerospace vehicle can be very adequately prepared.

After the satellite 60 is separated from the first stage rocket 10 and the second stage rocket 20, the satellite 60 is self-controlled by the electronic device 65 installed in the satellite 60.

The electronic device 65 installed in the satellite 60 has sufficient capability for controlling the first stage rocket 10 and the second rocket 20 as well as the satellite 60.

Further, in the above embodiment, although the rocket engines 12 and 22 use liquid fuel in the fuel tanks 11 and 12, solid fuel is also applicable to the present invention instead of the liquid fuel.

In the above embodiment, although the two staged rocket is described, a three, four or more than staged rocket is also applicable to the present invention.

The present invention is broadly applicable in an industry as an aerospace vehicle system with a simple structure, a low manufacturing cost and light weight.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. An aerospace vehicle system, comprising:
    a rocket having two or more stages;
    each of said two or more stages having a respective rocket engine;
    a satellite detachably fastened to the rocket;
    an electronic device installed inside the satellite;
    a signal line electrically connecting said electronic device located inside the satellite, said signal line extending from inside the satellite to outside of the satellite to the respective rocket engines in each of said stages of said rocket,
    a radio device installed inside the satellite; and
    a plurality of sensors, including at least one acceleration sensor installed inside the satellite and pressure and thermo sensors adapted to the rocket engines wherein the electronic device is connected to said radio device and said each of said plurality of sensors through the signal line,
    the electronic device controls the rocket to carry the satellite into outer space, said electronic device controlling each respective rocket engine in each of said two or more stages in accordance with signals obtained from said sensors, including from said pressure sensor and said thermo sensor,
    the electronic device controls the satellite in outer space after the satellite is detached from the rocket,
    the signal line is configured to divide into a satellite portion and a rocket portion, and
    prior to detachment of said satellite from said rocket, the electronic device controls the rocket through the signal line in accordance with (1) signals obtained from the plurality of sensors inside said satellite without any signals being obtained from any acceleration sensors within any of the two or more stages of said rocket and (2) commands received from the radio device, wherein said electronic device does not control the satellite based on said at least one acceleration sensor until after detachment of said satellite from said rocket and wherein before said detachment of said satellite from said rocket, said electronic device only controls engines or thrusters that are not controlled by said electronic device after said detachment of said satellite from said rocket,
    wherein the satellite is detachable from said rocket by being mounted within a fairing that is configured to physically separate from the rocket portion, and
    wherein said satellite is contained inside said fairing prior to detachment, whereby the satellite cannot be controlled to impart any vehicle motion prior to detachment.

2. The aerospace vehicle system as claimed in claim 1, wherein a booster is attached to said rocket and said electronic device is connected to said booster of said rocket engine through the signal lines.

3. The aerospace vehicle system as claimed in claim 1, wherein the signal line is a rocket-satellite common use bus.

4. The aerospace vehicle system as claimed in claim 1, wherein said plurality of sensors includes a plurality of different kinds of sensors.

5. The aerospace vehicle system as claimed in claim 1, wherein said at least one acceleration sensor includes an acceleration sensor and an angular acceleration sensor.

* * * * *